United States Patent
Souchkov

(10) Patent No.: US 11,385,163 B2
(45) Date of Patent: Jul. 12, 2022

(54) INTERFEROMETRIC DETECTION OF AN OBJECT ON A SURFACE USING WAVELENGTH MODULATION AND SYSTEMS FOR SAME

(71) Applicant: Becton, Dickinson and Company, Franklin Lakes, NJ (US)

(72) Inventor: Vitali Souchkov, Pinole, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

(21) Appl. No.: 17/163,843

(22) Filed: Feb. 1, 2021

(65) Prior Publication Data
US 2021/0255085 A1    Aug. 19, 2021

Related U.S. Application Data

(60) Provisional application No. 62/978,748, filed on Feb. 19, 2020.

(51) Int. Cl.
*G01N 15/14*    (2006.01)

(52) U.S. Cl.
CPC . *G01N 15/1425* (2013.01); *G01N 2015/1402* (2013.01); *G01N 2015/1454* (2013.01)

(58) Field of Classification Search
CPC ....... G01N 15/1425; G01N 2015/1454; G01N 2015/1402
See application file for complete search history.

(56) References Cited

U.S. PATENT DOCUMENTS

| | | | |
|---|---|---|---|
| 4,906,094 A * | 3/1990 | Ashida | G01N 15/0205 356/246 |
| 5,365,559 A | 11/1994 | Hsueh et al. | |
| 5,594,545 A * | 1/1997 | Saito | G01N 21/05 204/452 |

(Continued)

FOREIGN PATENT DOCUMENTS

| | | |
|---|---|---|
| JP | S613055 A | 1/1986 |
| WO | WO2011053147 A1 | 5/2011 |

*Primary Examiner* — Sang H Nguyen
(74) *Attorney, Agent, or Firm* — Khin K. Chin; Bret E. Field; Bozicevic, Field & Francis LLP

(57) ABSTRACT

Aspects of the present disclosure include methods for determining whether an object is present on a surface of a flow channel of a flow cell. Methods according to certain embodiments include irradiating the flow cell with two or more frequency modulated beams of light from a laser, detecting first and second reflected beams of light reflected by a first surface and a second surface of the flow channel, calculating a frequency of oscillations generated by interference between the first and second reflected beams of light, determining a distance between the first surface and the second surface based on the calculated frequency of interference oscillations and determining whether an object is present on the surface of the flow channel based on the determined distance. Systems for practicing the subject methods having a laser configured to irradiate a flow cell with two or more frequency modulated beams of light and a photodetector configured to detect reflected beams of light from surfaces of the flow channel are also described. Kits having a laser and an electric current source configured to adjust an input current to the laser are also provided.

20 Claims, 10 Drawing Sheets

(56) References Cited

U.S. PATENT DOCUMENTS

| | | | |
|---|---|---|---|
| 6,465,802 B1* | 10/2002 | Matsuda | G01N 15/0205 |
| | | | 250/574 |
| 2002/0018011 A1 | 2/2002 | Megerle | |
| 2003/0030783 A1* | 2/2003 | Roche | H04L 25/063 |
| | | | 356/39 |
| 2008/0079933 A1 | 4/2008 | Fukami | |
| 2008/0316481 A1 | 12/2008 | Van Den Engh | |
| 2009/0272914 A1* | 11/2009 | Feng | G01N 21/05 |
| | | | 250/459.1 |
| 2010/0320398 A1* | 12/2010 | Hoshishima | G01N 21/6408 |
| | | | 250/459.1 |
| 2012/0069340 A1* | 3/2012 | Mueller | G01N 21/0303 |
| | | | 356/440 |
| 2012/0225475 A1* | 9/2012 | Wagner | G01N 15/1434 |
| | | | 435/288.7 |
| 2013/0176080 A1* | 7/2013 | Nishida | H03L 7/26 |
| | | | 331/94.1 |
| 2015/0041682 A1* | 2/2015 | Cano | G01N 21/274 |
| | | | 250/459.1 |
| 2016/0216538 A1* | 7/2016 | McDonald | G02F 1/0147 |
| 2019/0391069 A1* | 12/2019 | Shimizu | G01N 21/05 |
| 2020/0271585 A1* | 8/2020 | Sasaki | G01N 15/1436 |

* cited by examiner

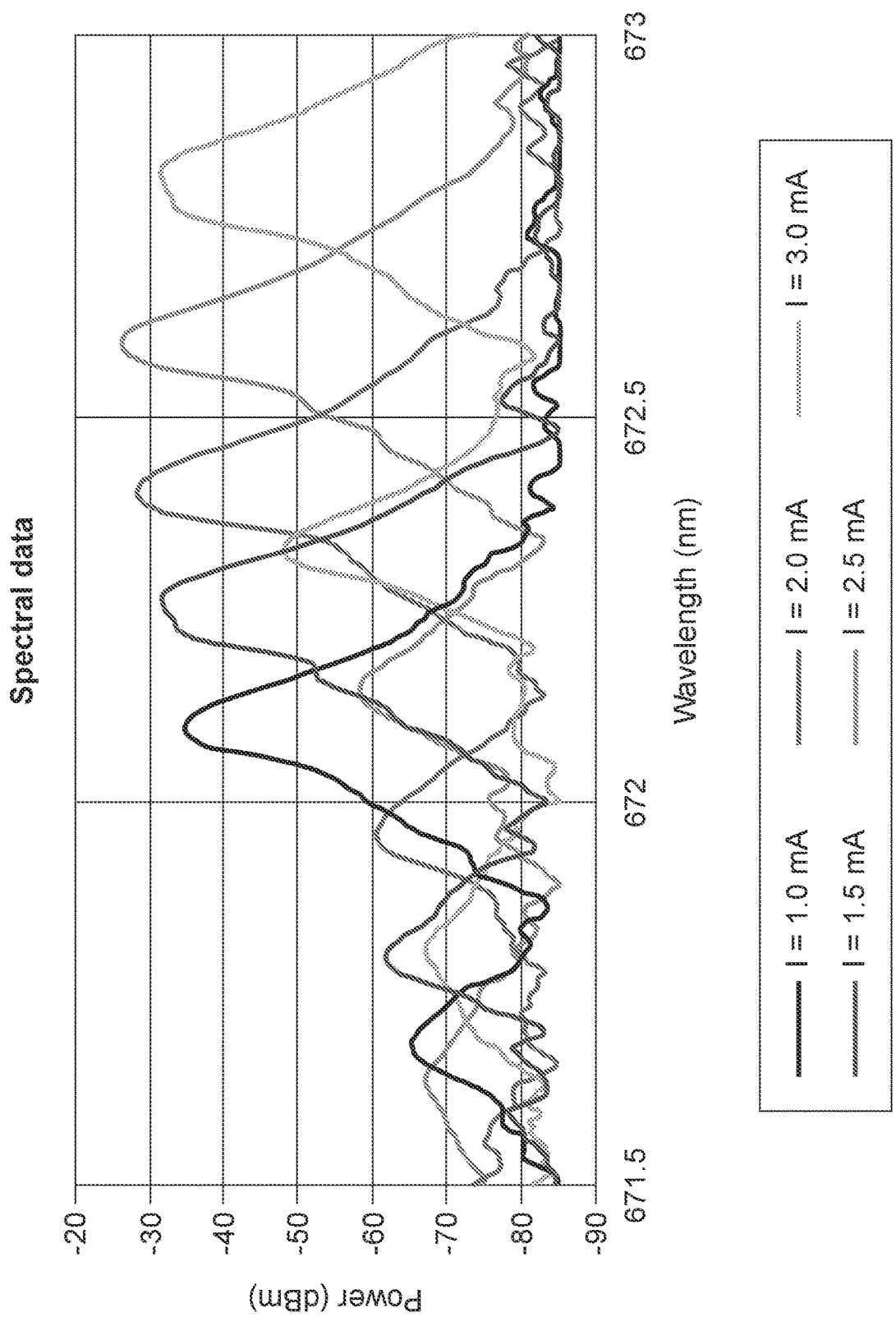

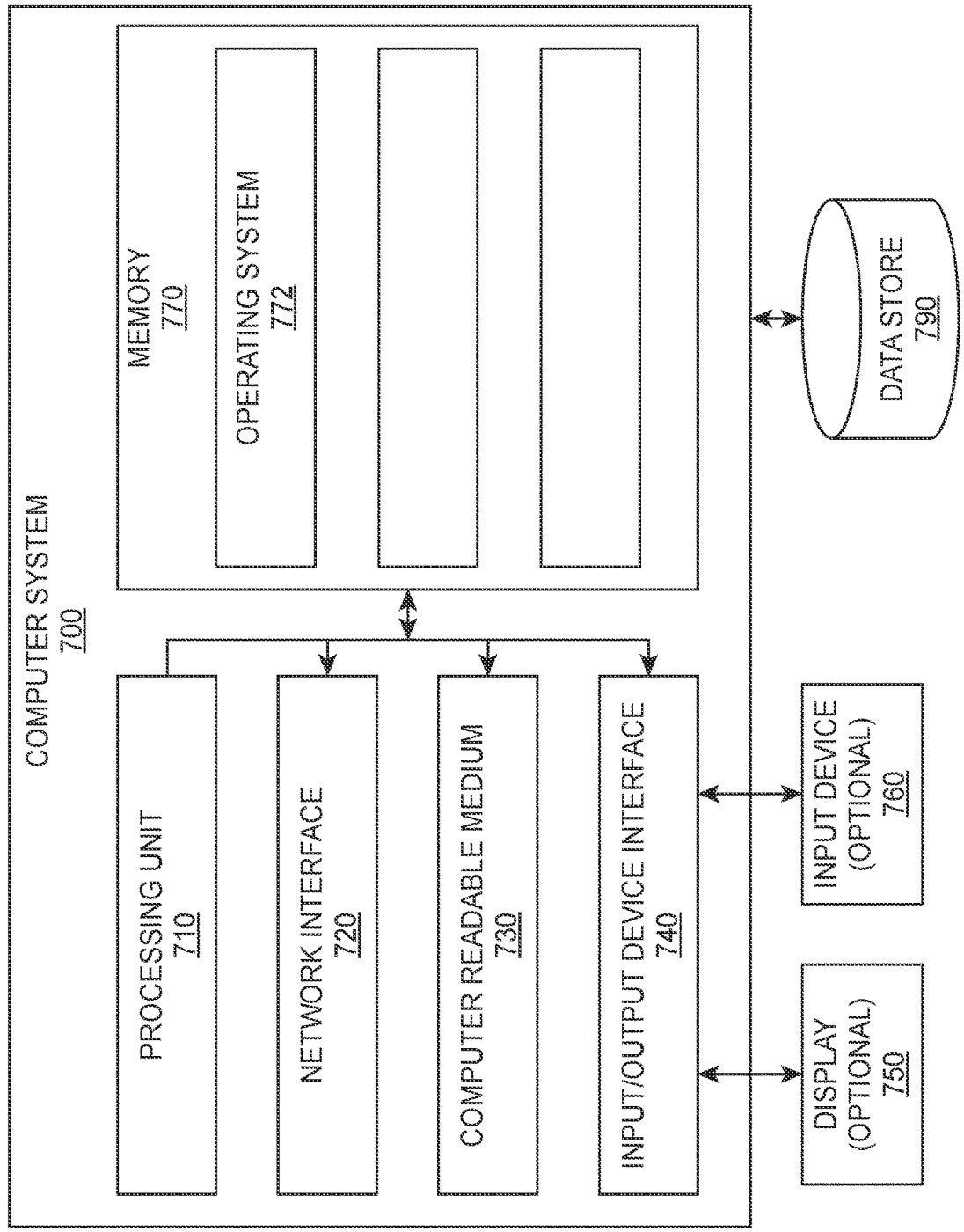

INTERFEROMETRIC DETECTION OF AN OBJECT ON A SURFACE USING WAVELENGTH MODULATION AND SYSTEMS FOR SAME

CROSS-REFERENCE TO RELATED APPLICATION

This application is related to U.S. Provisional Patent Application Ser. No. 62/978,748 filed Feb. 19, 2020; the disclosure of which application is herein incorporated by reference.

INTRODUCTION

Flow cytometry is a technique used to characterize and often times sort biological material, such as cells of a blood sample or particles of interest in another type of biological or chemical sample. A flow cytometer typically functions by transporting particles (e.g., cells) in the fluid sample as a flow stream through a flow cell, while also directing the sheath fluid to the flow cell. To characterize the components of particles in the flow stream, the flow stream is irradiated with light. Variations in the materials in the flow stream, such as morphologies or the presence of fluorescent labels, may cause variations in the observed light and these variations allow for characterization and separation.

To characterize the components in the flow stream, light must consistently impinge on the flow stream and be collected. The light source is aligned with the flow stream and an optical response from the illuminated particles is collected and quantified. Impurities in a sample or on the surface of the flow channel of a flow cell can affect the characterization of components in the sample.

SUMMARY

Aspects of the present disclosure include methods for determining whether an object is present on a surface of a flow channel of a flow cell. Methods according to certain embodiments include irradiating the flow cell with two or more frequency modulated beams of light from a laser, detecting first and second reflected beams of light reflected by a first surface and a second surface of the flow channel, calculating a frequency of oscillations generated by interference between the first and second reflected beams of light, determining a distance between the first surface and the second surface based on the calculated frequency of interference oscillations and determining whether an object is present on the surface of the flow channel based on the determined distance. Systems for practicing the subject methods having a laser configured to irradiate a flow cell with two or more frequency modulated beams of light and a photodetector configured to detect reflected beams of light from surfaces of the flow channel are also described. Kits having a laser and an electric current source configured to adjust an input current to the laser are also provided.

In embodiments, methods include irradiating a flow cell with two or more frequency modulated beams of light from a laser. In some instances, the laser is a low-power coherent laser. In certain instances, the laser is a vertical cavity surface emitting laser (VCSEL). In some embodiments, light from the laser is modulated over a predetermined interval of time, such as for an interval of 100 µs or more, such as an interval of 1000 µs or more. In some instances, modulating the frequency of the laser includes adjusting the input current to the laser during each modulation interval. For instances, the output frequency of the laser may be modulated by increasing the input current to the laser by 0.001 mA/µs or more, such as by 0.01 mA/µs or more. In certain instances, the input current to the laser is increased by a total amount of 1 mA or more over each modulation interval. In some embodiments, the input current to the laser is adjusted by employing a linear current ramp during each modulation interval. In other instances, the input current to the laser is adjusted by employing an exponential current ramp during each modulation interval.

In some embodiments, the flow cell is irradiated with a laser that is modulated at a frequency ranging from 1 KHz to 100 KHz. In certain embodiments, the wavelength of light emitted by the laser is changed during each modulation interval by 0.1 nm or, such as where the wavelength of light emitted by the laser during each modulation interval is varied over a range of from 0.1 nm to 5 nm.

In some embodiments, methods include calculating a distance between a first surface and a second surface of the flow channel according to the formula:

$$\Delta f_{if} = 2\frac{\Delta f_\lambda}{t_m}\frac{R}{c} = 2\frac{\delta\lambda}{\lambda^2}\frac{R}{t_m} \quad (1)$$

where: $\lambda$ is wavelength of irradiation; $\Delta f_\lambda$ is difference in optical frequency of modulated laser; $\Delta f_{if}$ is frequencies of interference oscillations; $t_m$ is time period of modulation; R is distance between the first surface and the second surface; c is speed of light; and $\delta\lambda$ is wavelength variation between minimum and maximum electric current input.

In other embodiments, methods include calculating a distance between a first surface and a second surface of the flow channel according to the formula:

$$t = \frac{\lambda^2}{2n\delta\lambda}\frac{\Delta f_{if}}{f_m} \quad (2)$$

where: t is distance between the first surface and the second surface; $\lambda$ is wavelength of irradiation; n is refractive index; $f_m$ is modulation frequency; $\Delta f_{if}$ is frequencies of interference oscillations; and $\delta\lambda$ is wavelength variation between minimum and maximum electric current input.

In still other embodiments, methods include laser modulation with a current ramp that depends on time such that in some examples the laser wavelength is expressed according to the formula:

$$\lambda_2(t) = \lambda_1 + \alpha I_0(e^{\frac{t}{\tau}} - 1) \quad (3)$$

where: $I_0$ is a first current input; $\lambda_1$ is wavelength of irradiation at the first input current; $\lambda_2$ is wavelength of irradiation at a second input current; $\alpha$ is a derivative of the wavelength over the current; t is time; and $\tau$ is exponential current ramp time constant.

In yet other embodiments, methods include calculating a distance between a first surface and a second surface of the flow channel according to the formula:

$$\Delta f_{if} = 2 \frac{\Delta f_\lambda}{t_m} \frac{R}{c} = 2 \frac{\delta \lambda}{\lambda^2} \frac{R}{t_m} \quad (1)$$

where: $\lambda$ is wavelength of irradiation; $\Delta f_\lambda$ is difference in optical frequency of modulated laser; $\Delta f_{if}$ is frequencies of interference oscillations; $t_m$ is time period of modulation; R is distance between the first surface and the second surface; c is speed of light; and $\delta\lambda$ is wavelength variation between minimum and maximum electric current input.

In other embodiments, the memory includes instructions, which when executed by the processor, cause the processor to calculate the distance between the first surface and the second surface of the flow channel according to the formula:

$$t = \frac{\lambda^2}{2n\delta\lambda} \frac{\Delta f_{if}}{f_m} \quad (2)$$

where: t is distance between the first surface and the second surface; $\lambda$ is wavelength of irradiation; n is refractive index; $f_m$ is modulation frequency; $\Delta f_{if}$ is frequencies of interference oscillations; and $\delta\lambda$ is wavelength variation between minimum and maximum electric current input.

In still other embodiments, methods include laser modulation with a current ramp that depends on time such that in some examples the laser wavelength is expressed according to the formula:

$$\lambda_2(t) = \lambda_1 + \alpha I_0 (e^{\frac{t}{\tau}} - 1) \quad (3)$$

where: $I_0$ is a first current input; $\lambda_1$ is wavelength of irradiation at the first input current; $\lambda_2$ is wavelength of irradiation at a second input current; $a$ is a derivative of the wavelength over the current; t is time; and $\tau$ is exponential current ramp time constant.

In yet other embodiments, the memory includes instructions, which when executed by the processor, cause the processor to calculate the distance between the first surface and the second surface of the flow channel according to the formula:

$$\frac{\Delta f_{if}}{f_m} = 2 \frac{I}{\lambda_1} \frac{1}{\left(1 + \frac{\lambda_1}{\alpha I_0 (e^{\frac{t}{\tau}} - 1)}\right)} \quad (4)$$

where: I is distance between the first surface and the second surface; $I_0$ is a first current input; $\lambda_1$ is wavelength of irradiation at the first input current; $\alpha$ is a derivative of the wavelength over the current; $f_m$ is modulation frequency; $\Delta f_{if}$ is frequencies of interference oscillations; t is modulation time period; and t is exponential current ramp time constant.

The memory also includes instructions, which when executed by the processor, cause the processor to determine whether an object is present on the surface of the flow channel based on the determined distance. In some embodiments, the memory includes instructions to compare the determined distance between the first surface and the second surface with an expected distance between the first surface and the second surface. In certain embodiments, the memory includes instructions to determine that an object is present $$\frac{\Delta f_{if}}{f_m} = 2 \frac{I}{\lambda_1} \frac{1}{\left(1 + \frac{\lambda_1}{\alpha I_0 (e^{\frac{t}{\tau}} - 1)}\right)} \quad (4)$$

where: I is distance between the first surface and the second surface; $I_0$ is a first current input; $\lambda_1$ is wavelength of irradiation at the first input current; $\alpha$ is a derivative of the wavelength over the current; $f_m$ is modulation frequency; $\Delta f_{if}$ is frequencies of interference oscillations; t is modulation time period; and $\tau$ is exponential current ramp time constant.

In embodiments, methods include determining whether an object is present on the surface of the flow channel based on the determined distance. In some embodiments, the determined distance between the first surface and the second surface is compared with an expected distance between the first surface and the second surface. In certain embodiments, an object is determined to be present on a surface of the flow channel when the determined distance and the expected distance between the first surface and the second surface do not match. In some embodiments, methods further include determining the expected distance between the first surface and the second surface. In these embodiments, methods may include: irradiating a flow cell that is known to be absent of any objects present on the surface of the flow channel (i.e., clean flow channel) with two or more frequency modulated beams of light from a laser; detecting first and second reflected beams of light reflected by a first surface and a second surface of the clean flow channel; calculating a frequency of oscillations generated by interference between the first and second reflected beams of light; determining the expected distance between the first surface and the second surface of the clean flow channel based on the calculated frequency of interference oscillations.

Systems for practicing the subject methods are also provided. Systems according to certain embodiments include a laser configured to irradiate a flow cell with two or more frequency modulated beams of light; a photodetector configured to detect first and second reflected beams of light reflected by a first surface and a second surface of the flow cell; and a processor having memory operably coupled to the processor where the memory includes instructions stored thereon, which when executed by the processor, cause the processor to: calculate a frequency of oscillations generated by interference between the first and second reflected beams of light; determine a distance between the first surface and the second surface based on the calculated frequency of interference oscillations; and determine whether an object is present on the surface of the flow channel based on the determined distance.

In embodiments, the laser is configured to be modulated over a period of time. In some embodiments, the laser is a low-power coherent light source. In certain embodiments, the laser is a vertical cavity surface emitting laser. In some embodiments, systems include an electric current source configured to adjust an input current to the laser over a modulation period. In some instances, the current source is configured to modulate the input current to the laser by employing a linear current ramp. In other instances, the current source is configured to modulate the input current to the laser by employing an exponential current ramp.

In some embodiments, the memory includes instructions, which when executed by the processor, cause the processor to calculate the distance between the first surface and the second surface of the flow channel according to the formula:

on a surface of the flow channel when the determined distance and the expected distance between the first surface and the second surface do not match.

Kits including one or more components of the subject systems are also provided. Kits according to certain embodiments include a flow cell having a flow channel, one or more lasers and an electric current source configured to adjust the input current to the laser to modulate the laser over one or more predetermined modulation periods. In some embodiments, lasers present in the kit are vertical cavity surface emitting lasers. The subject kits may also include one or more photodetectors, such as an avalanche photodiode.

BRIEF DESCRIPTION OF THE FIGURES

The invention may be best understood from the following detailed description when read in conjunction with the accompanying drawings. Included in the drawings are the following figures:

FIG. 1 depicts the change in wavelength of light emitted by a vertical cavity surface emitting laser in response to a change in input current according to certain embodiments.

FIG. 7 depicts a block diagram of a computing system according to certain embodiments.

DETAILED DESCRIPTION

Figure 2A:
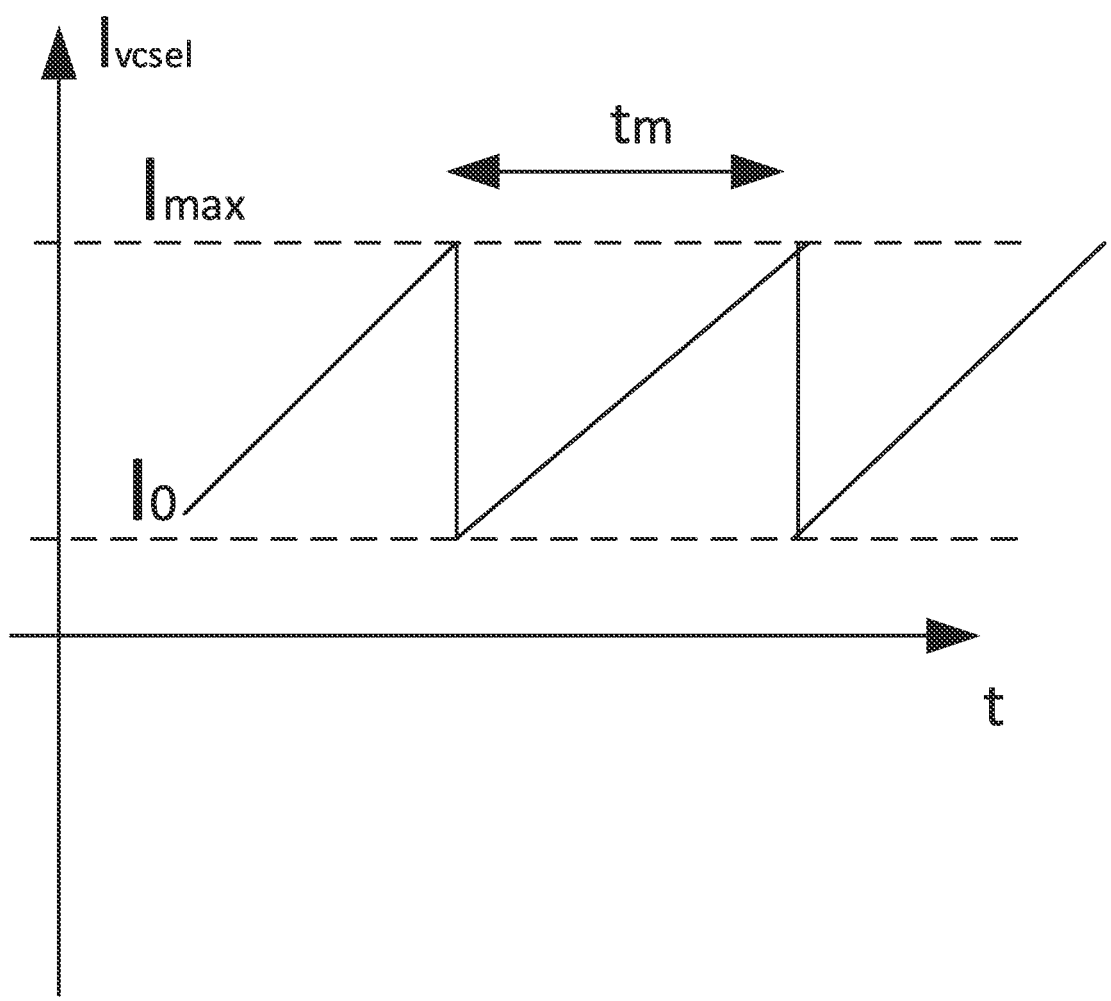
FIG. 2A depicts employing a linear current ramp to adjust input current to a laser during each modulation period according to certain embodiments.

Aspects of the present disclosure include methods for determining whether an object is present on a surface of a flow channel of a flow cell. Methods according to certain embodiments include irradiating the flow cell with two or more frequency modulated beams of light from a laser, detecting first and second reflected beams of light reflected by a first surface and a second surface of the flow channel, calculating a frequency of oscillations generated by interference between the first and second reflected beams of light, determining a distance between the first surface and the second surface based on the calculated frequency of interference oscillations and determining whether an object is present on the surface of the flow channel based on the determined distance. Systems for practicing the subject methods having a laser configured to irradiate a flow cell with two or more frequency modulated beams of light and a photodetector configured to detect reflected beams of light from surfaces of the flow channel are also described. Kits having a laser and an electric current source configured to adjust an input current to the laser are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for determining whether an object is present on a surface of a flow channel of a flow cell. In further describing embodiments of the disclosure, methods for irradiating a flow cell having a flow channel with two or more frequency modulated beams of light from a laser and determining whether an object is present on the surface of the flow channel based on a calculated distance between the surfaces of the flow channel are first described in greater detail. Next, systems suitable for practicing the subject methods are described. Kits having a laser, a flow cell and an electric current source for adjusting an input current to the laser to modulate the beams light from the laser are also provided.

Methods for Determining Whether an Object is Present on a Surface of a Flow Channel of a Flow Cell Aspects of the disclosure include methods for determining whether an object is present on a surface of a flow channel of a flow cell. In some embodiments, the subject methods include detecting the presence of a layer of material on the surface of the flow channel, such as a residual biological sample composition or an insoluble component of a sample. In certain embodiments, the layer of material on a surface of the flow channel detected by the subject methods has a thickness that is 1 mm or less, such as 0.1 mm or less, such as 0.01 mm or less, such as 0.001 mm or less, such as 0.0001 mm or less, such as 0.00001 mm or less, such as 0.000001 mm or less and including an object on a surface of the flow channel having a thickness that is 0.0000001 mm or less.

In practicing the subject methods, a flow cell having a flow channel is irradiated with two or more frequency modulated beams of light from a laser. In embodiments, the cross-sectional shape of the flow channel may include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In some embodiments, the cross-sectional shape of the flow channel is a rectangle. In other embodiments, the cross-sectional shape of the flow channel is a square. The width of the flow channel may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the width of the flow channel is 1000 µm.

The flow cell may be irradiated with the frequency modulated beams of light from the laser by at an angle that ranges from 1° to 90°, such as from 5° to 85°, such as from 10° to 80°, such as from 15° to 75°, such as from 20° to 70°, such as from 25° to 65° and including from 30° to 60°, for example at a 60° angle. The flow cell may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more.

In embodiments, the flow cell is irradiated with two or more frequency modulated beams of light from a laser, such as 3 or more, such as 4 or more, such as 5 or more, such as 6 or more, such as 7 or more, such as 8 or more, such as 9 or more, such as 10 or more and including 15 or more frequency modulated beams of light from a laser. In certain embodiments, the laser is a coherent laser. For example, the laser may be a vertical cavity surface emitting laser (VCSEL). In other embodiments, lasers of interest may include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the flow cell with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO4 laser, $Nd:YCa_4O(BO_3)_3$ laser, Nd:YCOB laser, titanium sapphire laser, thulium YAG laser, ytterbium YAG laser, ytterbium$_2$O$_3$ laser or cerium doped lasers and combinations thereof.

The intensity of the beams of laser light used to irradiate the flow cell may vary, depending on the type of laser and may be 0.01 mW/cm$^2$ or more, such as 0.05 mW/cm$^2$ or more, such as 0.1 mW/cm$^2$ or more, such as 0.5 mW/cm$^2$ or more, such as 1 mW/cm$^2$ or more, such as 2 mW/cm$^2$ or more, such as 3 mW/cm$^2$ or more, such as 4 mW/cm$^2$ or more, such as 5 mW/cm$^2$ or more, such as 10 mW/cm$^2$ or more, such as 15 mW/cm$^2$ or more, such as 25 mW/cm$^2$ or more, such as 50 mW/cm$^2$ or more, such as 100 mW/cm$^2$ or more, such as 250 mW/cm$^2$ or more, such as 500 mW/cm$^2$ or more and including 1000 mW/cm$^2$ or more. For example, the intensity of the laser used to irradiate the flow cell may range from 1 mW/cm$^2$ to 5000 mW/cm$^2$, such as from 2 mW/cm$^2$ to 4000 mW/cm$^2$, such as from 3 mW/cm$^2$ to 3000 mW/cm$^2$, such as from 4 mW/cm$^2$ to 2000 mW/cm$^2$ and including from 5 mW/cm$^2$ to 1000 mW/cm$^2$.

The flow cell may be irradiated by each frequency modulated beam of light directly or through one or more optical adjustment components. The term "optical adjustment" is used herein in its convention sense to refer to an optical component that changes or adjusts a characteristic of the laser light that is used to irradiate onto the flow cell. Optical adjustment, according to certain embodiments, may include changing the spatial width of irradiation or some other characteristic of irradiation from the laser light, such as for example, irradiation direction, beam width or focal point. Optical adjustment protocols may include but are not limited to lenses, mirrors, pinholes, slits, collimating protocols and combinations thereof.

The position of the irradiation on the flow channel may be adjusted during the subject methods, such as by directly moving (manually, mechanically or with a motor-driven displacement device) one or more of the laser or flow cell, moving a support stage coupled to the laser or flow cell or as well as changing the position, configuration or angle of orientation of one or more optical adjustment protocols. In some embodiments, the position of irradiation on the flow channel by the frequency modulated beams of light is adjusted by manually adjusting (e.g., by hand) the spatial position of one or more of the laser and the flow cell. For instance, the horizontal or vertical position or the angle of orientation of the laser may be manually adjusted. In other embodiments, the position of irradiation on the flow channel by the frequency modulated beams of light is adjusted by adjusting the spatial position of one or more of the laser and the flow cell with a mechanical actuator. Any convenient mechanical actuator can be used to mechanically adjust the spatial position of the laser, such as for example a mechanical leadscrew assembly or a mechanically operated geared translation device coupled to a support stage. For instance, the horizontal or vertical position or the angle of orientation of a support stage coupled to the laser may be mechanically adjusted.

In yet other embodiments, the position of irradiation on the flow channel by the frequency modulated beams of light from the laser are adjusted by adjusting the spatial position of one or more of the laser or flow cell with a motor-driven displacement device. Any convenient motor-driven actuator can be used, such as for example a motor actuated displacement stage, motor driven leadscrew assembly, motor-operated geared actuation device employing a stepper motor, servo motor, brushless electric motor, brushed DC motor, micro-step drive motor, high resolution stepper motor, among other types of motors.

In embodiments, the flow cell is irradiated with the two or more frequency modulated beams of light for a predetermined period of time and first and second reflected beams of light reflected by a first surface and a second surface of the flow channel are detected during each modulation period. The modulation period employed may vary, ranging from 5 µs to 5000 µs, such as from 10 µs to 4500 µs, such as from 15 µs to 4000 µs, such as from 20 µs to 3500 µs, such as from 25 µs to 3000 µs, such as from 30 µs to 2500 µs, such as from 35 µs to 2000 µs, such as from 40 µs to 1500 µs and including from 50 µs to 1000 µs. During each modulation period, the frequencies of light beams from the laser are modulated. In some embodiments, the beams of light from the laser are modulated at a frequency that ranges from 0.01 KHz to 500 KHz, such as from 0.05 KHz to 450 KHz, such as from 0.1 KHz to 400 KHz, such as from 0.5 KHz to 350 KHz, such as from 1 KHz to 300 KHz, such as from 2 KHz to 250 KHz, such as from 3 KHz to 200 KHz, such as from 4 KHz to 150 KHz and including from 5 KHz to 100 KHz.

In some embodiments, the wavelength of the beams of light emitted by the laser is changed during each frequency modulation period. The wavelength of light emitted by the laser may be changed through each modulation period by 0.1 nm or more, such as by 0.2 nm or more, such as by 0.3 nm or more, such as by 0.4 nm or more, such as by 0.5 nm or more, such as by 0.6 nm or more, such as by 0.7 nm or more, such as by 0.8 nm or more, such as by 0.9 nm or more, such as by 1.0 nm or more, such as by 2 nm or more, such as by 3 nm or more, such as by 4 nm or more and including by 5 nm or more. For example, the wavelength of light emitted by the laser may be changed through each modulation period by from 0.1 nm to 5 nm, such as from 0.2 nm to 4.9 nm, such as from 0.3 nm to 4.8 nm, such as from 0.4 nm to 4.7 nm, such as from 0.5 nm to 4.5 nm, such as from 1 nm to 4 nm and including from 2 nm to 3 nm.

FIG. 1 depicts the change in wavelength of light emitted by a vertical cavity surface emitting laser in response to a change in input current according to certain embodiments. As shown in FIG. 1, increasing input current drives the peak emitted wavelength of light from the laser to higher wavelengths. An input current of 1.0 mA to the laser generated emitted beams of light having a peak wavelength of about 672.1 nm whereas an input current of 3.0 mA to the laser generated emitted beams of light having a peak wavelength of about 672.8 nm.

In certain embodiments, the laser is frequency modulated by adjusting an input current to the laser, such as with an electric current source in operational communication with a vertical cavity surface emitting laser. In these embodiments, driving electric current through the laser changes the wavelength as a function of the current. Depending on the amount of frequency modulation of the laser desired, the input current to the laser may be adjusted by 0.001 mA or more, such as by 0.005 mA or more, such as by 0.01 mA or more, such as by 0.05 mA or more, such as by 0.1 mA or more, such as by 0.5 mA or more, such as by 1 mA or more, such as by 1.5 mA or more, such as by 2.0 mA or more, such as by 2.5 mA or more, such as by 3.0 mA or more, such as by 3.5 mA or more, such as by 4.0 mA or more, such as by 4.5 mA or more and including by 5.0 mA or more. For example, the input current to the laser may be increased by 0.001 mA or more, such as by 0.005 mA or more, such as by 0.01 mA or more, such as by 0.05 mA or more, such as by 0.1 mA or more, such as by 0.5 mA or more, such as by 1 mA or more, such as by 1.5 mA or more, such as by 2.0 mA or more, such as by 2.5 mA or more, such as by 3.0 mA or more, such as by 3.5 mA or more, such as by 4.0 mA or more, such as by 4.5 mA or more and including by 5.0 mA or more. In other instances, the input current to the laser may be decreased by 0.001 mA or more, such as by 0.005 mA or more, such as by 0.01 mA or more, such as by 0.05 mA or more, such as by 0.1 mA or more, such as by 0.5 mA or more, such as by 1 mA or more, such as by 1.5 mA or more, such as by 2.0 mA or more, such as by 2.5 mA or more, such as by 3.0 mA or more, such as by 3.5 mA or more, such as by 4.0 mA or more, such as by 4.5 mA or more and including by 5.0 mA or more.

The input current to the laser may be adjusted (i.e., increased or decreased) during each modulation period at a rate that varies, such at a rate of 0.00001 mA/µs or more, such as 0.00005 mA/µs or more, such as 0.0001 mA/µs or more, such as 0.0005 mA/µs or more, such as 0.001 mA/µs or more, such as 0.005 mA/µs or more, such as 0.01 mA/µs or more, such as 0.05 mA/µs or more and including at a rate of 0.01 mA/µs or more. In certain embodiments, the input current to the laser is adjusted by 0.01 mA or more over a period of 1000 µs, such as by 0.05 mA or more over a period of 1000 µs, such as by 0.1 mA or more over a period of 1000 µs, such as by 0.5 mA or more over a period of 1000 µs, such as by 1 mA or more over a period of 1000 µs, such as by 1.5 mA over a period of 1000 µs, such as by 2.0 mA over a period of 1000 µs, such as by 2.5 mA over a period of 1000 µs and including by 3.0 mA over a period of 1000 µs.

Figure 2B:
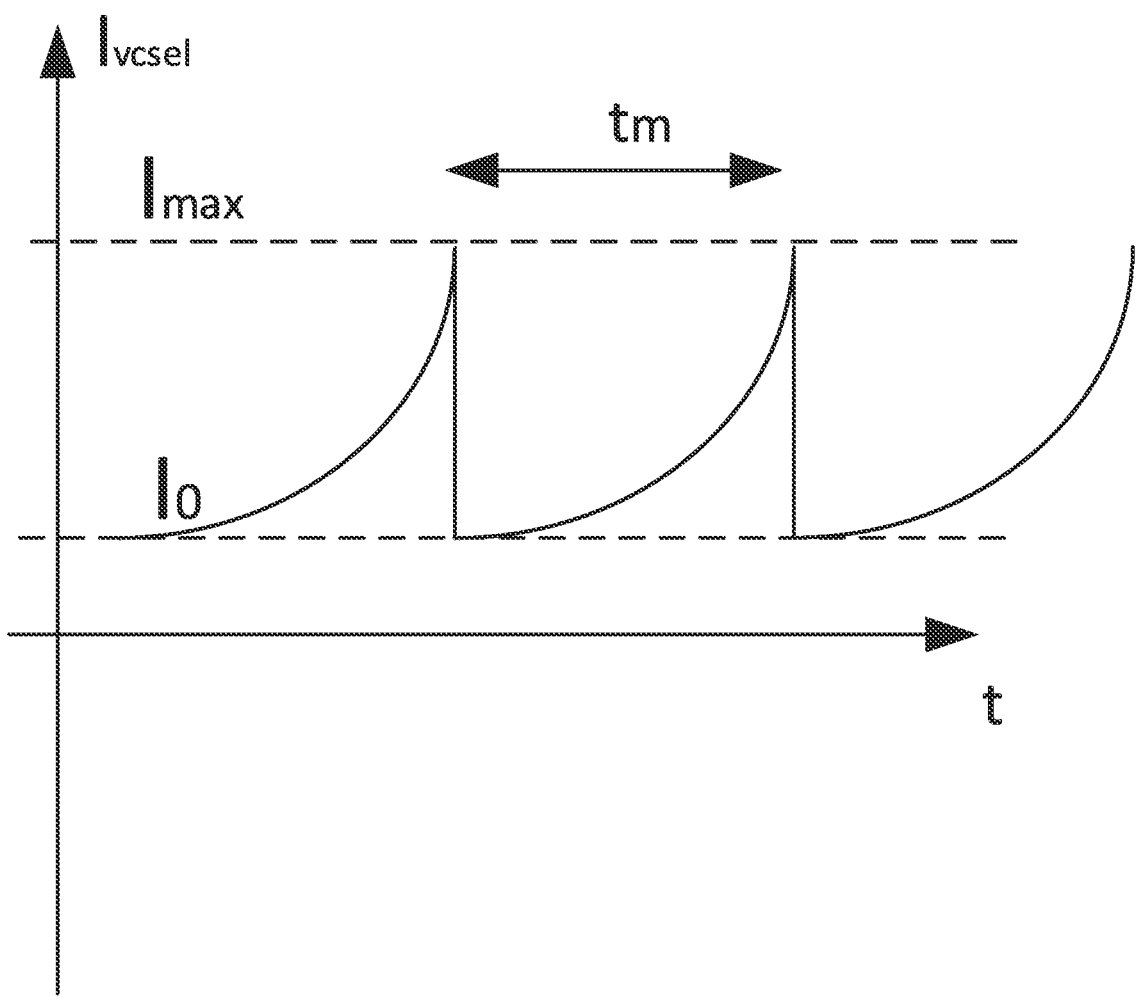
FIG. 2B depicts employing an exponential current ramp to adjust input current to a laser during each modulation period according to certain embodiments.

In some embodiments, methods include adjusting the input current to the laser by employing a linear current ramp during each modulation period. In these embodiments, the input current is adjusted during each modulation period at a constant rate. FIG. 2A depicts employing a linear current ramp to adjust input current to a laser during each modulation period according to certain embodiments. As depicted in FIG. 2A, the input current ($I_{vcsel}$) to the laser is increased at a constant rate from an initial input current ($I_0$) to a maximal input current ($I_{max}$) during each modulation period ($t_m$). In other embodiments, methods include adjusting the input current to the laser by employing an exponential current ramp during each modulation period. In these embodiments, the input current is adjusted during each modulation period at an exponential rate. FIG. 2B depicts employing an exponential current ramp to adjust input current to a laser during each modulation period according to certain embodiments. As depicted in FIG. 2B, the input current ($I_{vcsel}$) to the laser is exponentially increased from an initial input current ($I_0$) to a maximal input current ($I_{max}$) during each modulation period ($t_m$). In certain embodiments, the initial input current $I_0$ is chosen to keep the laser always turned on so that the emission wavelength is modulated continuously as a function of the input current.

In practicing the subject methods, beams of light reflected from two different surfaces of the flow channel are detected and electric field oscillations produced by the interfering beams are calculated to determine a distance from the two different surfaces of the flow channel. Light reflected from the first surface and the second surface of the flow channel may be detected by any convenient light detecting protocol, including but not limited to photosensors or photodetectors, such as active-pixel sensors (APSs), photodiodes, quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, avalanche photodiodes, photomultiplier tubes, phototransistors, quantum dot photoconductors or photodiodes and combinations thereof, among other photodetectors. In certain embodiments, light reflected by the irradiated flow channel is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, light is measured with a charge-coupled device (CCD). In certain embodiments, the light signals are detected with a photodiode. Where the light signals are detected with a photodiode, the active detecting surface area of each region of the photodiode may vary, such as from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$. In some instances, the photodetector is a photodiode array having more than one photodiode, such as two or more photodiodes, such as three or more, such as five or more and including 10 or more photodiodes.

In certain embodiments, the detector is positioned apart in space from the flow cell and light from the flow cell is propagated to the detector through an optical relay system, such as with fiber optics or a free space light relay system. For example, the optical relay system may be a fiber optics light relay bundle and light is conveyed through the fiber optics light relay bundle to the detector. Any fiber optics light relay system may be employed to propagate light to the detector. In certain embodiments, suitable fiber optics light relay systems for propagating light to the detector include, but are not limited to, fiber optics light relay systems such as those described in U.S. Pat. No. 6,809,804, the disclosure of which is herein incorporated by reference. In other embodiments, the optical relay system is a free-space light relay system. The phrase "free-space light relay" is used herein in its conventional sense to refer to light propagation that employs a configuration of one or more optical components to direct light to the detector through free-space. In certain embodiments, the free-space light relay system includes a housing having a proximal end and a distal end, the proximal end being coupled to the detector. The free-space relay system may include any combination of different beam shaping components, such as one or more of lenses, mirrors, slits, pinholes, wavelength separators, or a combination thereof. For example, in some embodiments, free-space light relay systems of interest include one or more focusing lens. In other embodiments, the subject free-space light relay systems include one or more mirrors. In yet other embodiments, the free-space light relay system includes a collimating lens. In certain embodiments, suitable free-space light relay systems for propagating light to the detector, but are not limited to, light relay systems such as those described in U.S. Pat. Nos. 7,643,142; 7,728,974 and 8,223,445, the disclosures of which is herein incorporated by reference.

The reflected beams of light from the flow channel may be measured continuously or in discrete intervals. In some instances, methods include taking measurements of the light continuously. In other instances, the light is measured in discrete intervals, such as measuring light every 0.001 µs, every 0.01 µs, every 0.1 µs, every 1 µs, every 10 µs, every 100 µs and including every 1000 µs, or some other interval. Measurements of the light may be taken one or more times during the subject methods, such as 2 or more times, such as 3 or more times, such as 5 or more times and including 10 or more times. In certain embodiments, the light propagation is measured 2 or more times, with the data in certain instances being averaged.

In practicing the subject methods, electric field oscillations produced by interfering beams of light reflected by the surface of the flow channel are calculated. The electric field oscillations can be measured using any convenient protocol, such as with peak identifying and measurement software on an oscilloscope. Depending of the frequency of the modulated beams of light, the calculated oscillations generated by interference between the beams of light reflected by the flow channel may range from 0.1 µs$^{-1}$ to 5000 µs$^{-1}$, such as from 0.5 µs$^{-1}$ to 4500 µs$^{-1}$, such as from 1 µs$^{-1}$ to 4000 µs$^{-1}$, such as from 2 µs$^{-1}$ to 3500 µs$^{-1}$, such as from 3 µs$^{-1}$ to 3000 µs$^{-1}$, such as from 4 µs$^{-1}$ to 2500 µs$^{-1}$, such as from 5 µs$^{-1}$ to 2000 µs$^{-1}$, such as from 6 µs$^{-1}$ to 1500 µs$^{-1}$, such as from 7 µs$^{-1}$ to 1000 µs$^{-1}$, such as from 8 µs$^{-1}$ to 900 µs$^{-1}$, such as from 9 µs$^{-1}$ to 800 µs$^{-1}$ and including from 10 µs$^{-1}$ to 750 µs$^{-1}$.

In some embodiments, the electric field oscillations are measured continuously during each modulation period. In other embodiments, the electric field oscillations are measure one or more times during each modulation period, such as 1 or more times, such as 2 or more times, such as 3 or more times, such as 4 or more times, such as 5 or more times, such as 10 or more times, such as 25 or more times, such as 50 or more times, such as 100 or more times, such as 1000 or more times and including 5000 or more times. The electric field oscillations may be measured at random times or in discrete intervals, such as every 0.001 µs, every 0.01 µs, every 0.1 µs, every 1 µs, every 10 µs, including every 100 µs.

Figure 3:
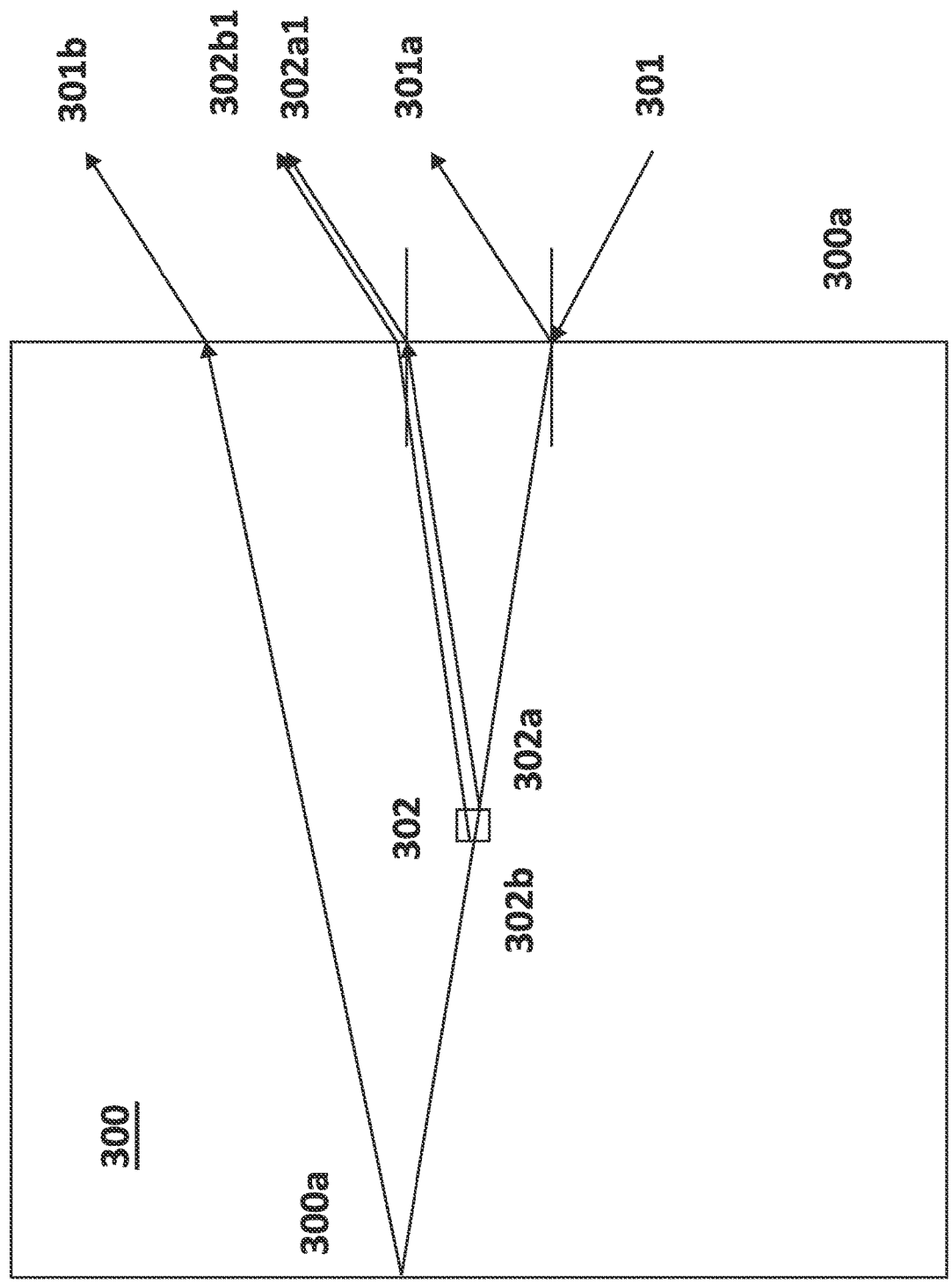
FIG. 3 depicts of a cross-section of a flow cell irradiated by frequency modulated beams of light from a laser according to certain embodiments.

FIG. 3 depicts of a cross-section of a flow cell irradiated by a frequency modulated beam of light from a laser according to certain embodiments. Flow cell 300 is irradiated with frequency modulated beam of light 301. Light beam 301 is reflected from outer surface 300a of flow cell 300 to generate reflected beam of light 301a. Light beam 301 is reflected from inner surface 300b of flow cell 300 to generate reflected beam of light 301b. Light beam 301 is reflected off of two different surfaces (outer surface 302a and inner surface 302b) of flow channel 302, generating reflected beams of light 302a1 and 302b1. Interference between light 302a1 and 302b1 generates electric field oscillations which are used to determine the distance between outer surface 302a and inner surface 302b of flow channel 302.

The distance between the surfaces of the flow channel is determined based on the calculated frequency of oscillations generated by interference between light reflected from the surfaces. In some embodiments, methods include calculating a distance between a first surface and a second surface of the flow channel according to the formula:

$$\Delta f_{if} = 2 \frac{\Delta f_\lambda}{t_m} \frac{R}{c} = 2 \frac{\delta \lambda}{\lambda^2} \frac{R}{t_m} \qquad (1)$$

where: $\lambda$ is wavelength of irradiation; $\Delta f_\lambda$ is difference in optical frequency of modulated laser; Off is frequencies of interference oscillations; $t_m$ is time period of modulation; R is distance between the first surface and the second surface; c is speed of light; and $\delta \lambda$ is wavelength variation between minimum and maximum electric current input.

In other embodiments, methods include calculating a distance between a first surface and a second surface of the flow channel according to the formula:

$$t = \frac{\lambda^2}{2n\delta\lambda} \frac{\Delta f_{if}}{f_m} \qquad (2)$$

where: t is distance between the first surface and the second surface; $\lambda$ is wavelength of irradiation; n is refractive index; $f_m$ is modulation frequency; $\Delta f_{if}$ is frequencies of interference oscillations; and OX is wavelength variation between minimum and maximum electric current input.

In still other embodiments, methods include laser modulation with a current ramp that depends on time such that in some examples the laser wavelength is expressed according to the formula:

$$\lambda_2(t) = \lambda_1 + \alpha I_0 (e^{\frac{t}{\tau}} - 1) \qquad (3)$$

where: $I_0$ is a first current input; $\lambda_1$ is wavelength of irradiation at the first input current; $\lambda_2$ is wavelength of irradiation at a second input current; $\alpha$ is a derivative of the wavelength over the current; t is time; and $\tau$ is exponential current ramp time constant.

In yet other embodiments, methods include calculating a distance between a first surface and a second surface of the flow channel according to the formula:

$$\frac{\Delta f_{if}}{f_m} = 2 \frac{I}{\lambda_1} \frac{1}{\left(1 + \frac{\lambda_1}{\alpha I_0 (e^{\frac{t}{\tau}} - 1)}\right)} \qquad (4)$$

where: I is distance between the first surface and the second surface; $I_0$ is a first current input; Xi is wavelength of irradiation at the first input current; a is a derivative of the wavelength over the current; $f_m$ is modulation frequency; $\Delta f_{if}$ is frequencies of interference oscillations; t is modulation time period; and $\tau$ is exponential current ramp time constant.

In embodiments, methods also include determining whether an object is present on the surface of the flow channel based on the determined distance. In some embodiments, the determined distance between the first surface and the second surface is compared with an expected distance between the first surface and the second surface. In certain embodiments, an object is determined to be present on a surface of the flow channel when the determined distance and the expected distance between the first surface and the second surface do not match. In other embodiments, an object is determined to be present on a surface of the flow channel when the difference between the determined distance and the expected distance between the first surface and the second surface is above a predetermined threshold, such as where the difference between the determined distance and the expected distance between the first surface and the second surface is 0.01 µm or more, such as 0.05 µm or more, such as 0.1 µm or more, such as 0.5 µm or more, such as 1 µm or more, such as 2 µm or more, such as 3 µm or more, such as 4 µm or more, such as 5 µm or more, such as 6 µm or more, such as 7 µm or more, such as 8 µm or more, such as 9 µm or more, such as 10 µm or more, such as 20 µm or more, such as 30 µm or more, such as 40 µm or more and including where the difference between the determined distance and the expected distance between the first surface and the second surface is 100 µm or more.

Systems for Determining Whether an Object is Present on a Surface of a Flow Channel of a Flow Cell Aspects of the disclosure include also systems for determining whether an object is present on a surface of a flow channel of a flow cell. Systems according to certain embodiments include a laser configured to irradiate a flow cell with two or more frequency modulated beams of light; a photodetector configured to detect first and second reflected beams of light reflected by a first surface and a second surface of the flow cell; and a processor having memory operably coupled to the processor where the memory includes instructions stored thereon, which when executed by the processor, cause the processor to: calculate a frequency of oscillations generated by interference between the first and second reflected beams of light; determine a distance between the first surface and the second surface based on the calculated frequency of interference oscillations; and determine whether an object is present on the surface of the flow channel based on the determined distance.

In some embodiments, the subject systems are configured detect the presence of a layer of material on the surface of the flow channel, such as a residual biological sample composition or an insoluble component of a sample. In certain embodiments, the layer of material on a surface of the flow channel detected with the subject systems has a thickness that is 1 mm or less, such as 0.1 mm or less, such as 0.01 mm or less, such as 0.001 mm or less, such as 0.0001 mm or less, such as 0.00001 mm or less, such as 0.000001 mm or less and including an object on a surface of the flow channel having a thickness that is 0.0000001 mm or less.

In some embodiments, systems include a flow cell having a flow channel. In embodiments, the cross-sectional shape of the flow channel may vary and may be a rectilinear cross sectional shape, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In some embodiments, the cross-sectional shape of the flow channel is a rectangle. In other embodiments, the cross-sectional shape of the flow channel is a square. The width of the flow channel may vary, in some embodiments ranging from 1 μm to 20000 μm, such as from 2 μm to 17500 μm, such as from 5 μm to 15000 μm, such as from 10 μm to 12500 μm, such as from 15 μm to 10000 μm, such as from 25 μm to 7500 μm, such as from 50 μm to 5000 μm, such as from 75 μm to 1000 μm, such as from 100 μm to 750 μm and including from 150 μm to 500 μm. In certain embodiments, the width of the flow channel is 1000 μm.

The laser may be positioned to irradiate the flow cell at an angle that ranges from 1° to 90°, such as from 5° to 85°, such as from 10° to 80°, such as from 15° to 75°, such as from 20° to 70°, such as from 25° to 65° and including from 30° to 60°, for example at a 60° angle. The laser may also be positioned from the flow cell at a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more.

In certain embodiments, the laser is a coherent laser. For example, the laser may be a vertical cavity surface emitting laser (VCSEL). In other embodiments, lasers of interest may include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the flow cell with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO4 laser, $Nd:YCa_4O(BO_3)_3$ laser, Nd:YCOB laser, titanium sapphire laser, thulium YAG laser, ytterbium YAG laser, $ytterbium_2O_3$ laser or cerium doped lasers and combinations thereof.

The intensity of the beams of laser light generated by lasers of interest may vary, depending on the type of laser and may be 0.01 mW/cm$^2$ or more, such as 0.05 mW/cm$^2$ or more, such as 0.1 mW/cm$^2$ or more, such as 0.5 mW/cm$^2$ or more, such as 1 mW/cm$^2$ or more, such as 2 mW/cm$^2$ or more, such as 3 mW/cm$^2$ or more, such as 4 mW/cm$^2$ or more, such as 5 mW/cm$^2$ or more, such as 10 mW/cm$^2$ or more, such as 15 mW/cm$^2$ or more, such as 25 mW/cm$^2$ or more, such as 50 mW/cm$^2$ or more, such as 100 mW/cm$^2$ or more, such as 250 mW/cm$^2$ or more, such as 500 mW/cm$^2$ or more and including 1000 mW/cm$^2$ or more. For example, the intensity of the laser used to irradiate the flow cell may range from 1 mW/cm$^2$ to 5000 mW/cm$^2$, such as from 2 mW/cm$^2$ to 4000 mW/cm$^2$, such as from 3 mW/cm$^2$ to 3000 mW/cm$^2$, such as from 4 mW/cm$^2$ to 2000 mW/cm$^2$ and including from 5 mW/cm$^2$ to 1000 mW/cm$^2$.

In some embodiments, the position of one or more of the laser and the flow cell may be configured to be adjusted. The position of one or more of the laser and the flow cell may be adjusted by any convenient protocol, such as by directly moving (manually, mechanically or with a motor-driven displacement device) the laser or flow cell, moving a support stage coupled to the laser or flow cell or as well as changing the position, configuration or angle of orientation of one or more optical adjustment protocols. In some embodiments, the position of one or more of the laser or the flow cell is configured to be manually adjusted (e.g., by hand). For instance, the horizontal or vertical position or the angle of orientation of the laser or flow cell may be configured to be manually adjusted. In other embodiments, systems include a mechanical actuator for adjusting the position of one or more of the laser or flow cell. Any convenient mechanical actuator can be used to mechanically adjust the spatial position of the laser or flow cell, such as for example a mechanical leadscrew assembly or a mechanically operated geared translation device coupled to a support stage. For instance, the horizontal or vertical position or the angle of orientation of a support stage coupled to the laser may be mechanically adjusted.

In yet other embodiments, the position of one or more of the laser and the flow cell are configured to be adjusted by adjusting the spatial position of the laser or flow cell with a motor-driven displacement device. Any convenient motor-driven actuator can be used, such as for example a motor actuated displacement stage, motor driven leadscrew assembly, motor-operated geared actuation device employing a stepper motor, servo motor, brushless electric motor, brushed DC motor, micro-step drive motor, high resolution stepper motor, among other types of motors.

In embodiments, the subject systems are configured for irradiating a flow cell with the two or more frequency modulated beams of light for a predetermined period of time and first and second reflected beams of light reflected by a first surface and a second surface of the flow channel are detected with one or more photodetectors during each modulation period. Lasers of the subject systems may be configured to be modulated for a duration ranging from 5 μs to 5000 μs, such as from 10 μs to 4500 μs, such as from 15 μs to 4000 μs, such as from 20 μs to 3500 μs, such as from 25 μs to 3000 μs, such as from 30 μs to 2500 μs, such as from 35 μs to 2000 μs, such as from 40 μs to 1500 μs and including from 50 μs to 1000 μs. During each modulation period, the frequencies of light beams from the laser are modulated. In some embodiments, light from the laser is configured to be modulated at a frequency that ranges from 0.01 KHz to 500 KHz, such as from 0.05 KHz to 450 KHz, such as from 0.1 KHz to 400 KHz, such as from 0.5 KHz to 350 KHz, such as from 1 KHz to 300 KHz, such as from 2 KHz to 250 KHz, such as from 3 KHz to 200 KHz, such as from 4 KHz to 150 KHz and including from 5 KHz to 100 KHz.

In some embodiments, lasers are configured to change the emitted wavelength light emitted during each frequency modulation period. The wavelength of light emitted by the laser may be changed through each modulation period by 0.1 nm or more, such as by 0.2 nm or more, such as by 0.3 nm or more, such as by 0.4 nm or more, such as by 0.5 nm or more, such as by 0.6 nm or more, such as by 0.7 nm or more, such as by 0.8 nm or more, such as by 0.9 nm or more, such as by 1.0 nm or more, such as by 2 nm or more, such as by 3 nm or more, such as by 4 nm or more and including by 5 nm or more. For example, the wavelength of light emitted by the laser may be changed through each modulation period by from 0.1 nm to 5 nm, such as from 0.2 nm to 4.9 nm, such as from 0.3 nm to 4.8 nm, such as from 0.4 nm to 4.7 nm, such as from 0.5 nm to 4.5 nm, such as from 1 nm to 4 nm and including from 2 nm to 3 nm.

In certain embodiments, systems further include an electric current source in operational communication with the laser to adjust the input current to the laser. Depending on the amount of frequency modulation of the laser desired, the electric current source may be configured to adjust the input current to the laser by 0.001 mA or more, such as by 0.005 mA or more, such as by 0.01 mA or more, such as by 0.05 mA or more, such as by 0.1 mA or more, such as by 0.5 mA or more, such as by 1 mA or more, such as by 1.5 mA or more, such as by 2.0 mA or more, such as by 2.5 mA or more, such as by 3.0 mA or more, such as by 3.5 mA or more, such as by 4.0 mA or more, such as by 4.5 mA or more and including by 5.0 mA or more. For example, the electric current source may be configured to increase the input current to the laser by 0.001 mA or more, such as by 0.005 mA or more, such as by 0.01 mA or more, such as by 0.05 mA or more, such as by 0.1 mA or more, such as by 0.5 mA or more, such as by 1 mA or more, such as by 1.5 mA or more, such as by 2.0 mA or more, such as by 2.5 mA or more, such as by 3.0 mA or more, such as by 3.5 mA or more, such as by 4.0 mA or more, such as by 4.5 mA or more and including by 5.0 mA or more. In other instances, the electric current source may be configured to decrease the input current to the laser 0.001 mA or more, such as by 0.005 mA or more, such as by 0.01 mA or more, such as by 0.05 mA or more, such as by 0.1 mA or more, such as by 0.5 mA or more, such as by 1 mA or more, such as by 1.5 mA or more, such as by 2.0 mA or more, such as by 2.5 mA or more, such as by 3.0 mA or more, such as by 3.5 mA or more, such as by 4.0 mA or more, such as by 4.5 mA or more and including by 5.0 mA or more.

In some embodiments, the electric current source may be configured to adjust the input current to the laser at a rate of 0.00001 mA/µs or more, such as 0.00005 mA/µs or more, such as 0.0001 mA/µs or more, such as 0.0005 mA/µs or more, such as 0.001 mA/µs or more, such as 0.005 mA/µs or more, such as 0.01 mA/µs or more, such as 0.05 mA/µs or more and including at a rate of 0.01 mA/µs or more. In certain embodiments, the electric current source may be configured to adjust the input current to the laser by 0.01 mA or more over a period of 1000 µs, such as by 0.05 mA or more over a period of 1000 µs, such as by 0.1 mA or more over a period of 1000 µs, such as by 0.5 mA or more over a period of 1000 µs, such as by 1 mA or more over a period of 1000 µs, such as by 1.5 mA over a period of 1000 µs, such as by 2.0 mA over a period of 1000 µs, such as by 2.5 mA over a period of 1000 µs and including by 3.0 mA over a period of 1000 µs.

In some embodiments, the electric current source may be configured to adjust the input current to the laser by employing a linear current ramp during each modulation period. In these embodiments, the electric current source is configured to adjust the input current to the laser during each modulation period at a constant rate. In other embodiments, the electric current source may be configured to adjust the input current to the laser by employing an exponential current ramp during each modulation period. In these embodiments, the electric current source is configured to adjust the input current to the laser during each modulation period at an exponential rate.

In embodiments, systems include a photodetector configured to detect first and second reflected beams of light reflected by a first surface and a second surface of the flow channel. Photodetectors of interest may include any convenient light detecting protocol, including but not limited to active-pixel sensors (APSs), photodiodes, quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, avalanche photodiodes, photomultiplier tubes, phototransistors, quantum dot photoconductors or photodiodes and combinations thereof, among other photodetectors. In certain embodiments, light reflected by the irradiated flow channel is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, systems include a photodiode such as an avalanche photodiode. Where systems include a photodiode, the active detecting surface area of each region of the photodiode may vary, such as from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$. In some instances, the photodetector is a photodiode array having more than one photodiode, such as two or more photodiodes, such as three or more, such as five or more and including 10 or more photodiodes.

Photodetectors may be configured to measured light continuously or in discrete intervals. In some instances, photodetectors are configured to take measurements continuously. In other instances, photodetectors are configured to take measurements in discrete intervals, such as measuring light every 0.001 µs, every 0.01 µs, every 0.1 µs, every 1 µs, every 10 µs, every 100 µs and including every 1000 µs, or some other interval.

In embodiments, systems may include computer controlled systems where the systems further include one or more computers for complete automation or partial automation of a system for practicing methods described herein. In some embodiments, systems include a computer having a computer readable storage medium with a computer program stored thereon, where the computer program when loaded on the computer further includes instructions for calculating electric field oscillations produced by interfering beams of light reflected by the surfaces of the flow channel. Systems may include any convenient protocol for calculating the electric field oscillations, such as with peak identifying and measurement software on an oscilloscope. Depending of the frequency of the modulated beams of light, the calculated oscillations generated by interference between the beams of light reflected by the flow channel may range from 0.1 $µs^{-1}$ to 5000 $µs^{-1}$, such as from 0.5 $µs^{-1}$ to 4500 $µs^{-1}$, such as from 1 $µs^{-1}$ to 4000 $µs^{-1}$, such as from 2 $µs^{-1}$ to 3500 $µs^{-1}$, such as from 3 $µs^{-1}$ to 3000 $µs^{-1}$, such as from 4 $µs^{-1}$ to 2500 $µs^{-1}$, such as from 5 $µs^{-1}$ to 2000 $µs^{-1}$, such as from 6 $µs^{-1}$ to 1500 $µs^{-1}$, such as from 7 $µs^{-1}$ to 1000 $µs^{-1}$, such as from 8 $µs^{-1}$ to 900 $µs^{-1}$, such as from 9 $µs^{-1}$ to 800 $µs^{-1}$ and including from 10 $µs^{-1}$ to 750 $µs^{-1}$.

In some embodiments, systems include a computer having a computer readable storage medium with a computer program stored thereon, where the computer program when loaded on the computer further includes instructions for continuously measuring the electric field oscillations during each modulation period. In other embodiments, systems include a computer having a computer readable storage medium with a computer program stored thereon, where the computer program when loaded on the computer further includes instructions for measuring the electric field oscillations one or more times during each modulation period, such as 1 or more times, such as 2 or more times, such as 3 or more times, such as 4 or more times, such as 5 or more times, such as 10 or more times, such as 25 or more times, such as 50 or more times, such as 100 or more times, such as 1000 or more times and including 5000 or more times. The electric field oscillations may be measured at random times or in discrete intervals, such as every 0.001 µs, every 0.01 µs, every 0.1 µs, every 1 µs, every 10 µs, including every 100 µs.

In embodiments, the memory includes instructions, which when executed by the processor, cause the processor to calculate the distance between the first surface and the second surface of the flow channel. In some embodiments, the distance between the first surface and the second surface of the flow channel is calculated by the processor according to the formula:

$$\Delta f_{if} = 2\frac{\Delta f_\lambda}{t_m}\frac{R}{c} = 2\frac{\delta\lambda}{\lambda^2}\frac{R}{t_m} \quad (1)$$

where: $\lambda$ is wavelength of irradiation; $\Delta f_\lambda$ is difference in optical frequency of modulated laser; $\Delta f_{if}$ is frequencies of interference oscillations; $t_m$ is time period of modulation; R is distance between the first surface and the second surface; c is speed of light; and $\delta\lambda$ is wavelength variation between minimum and maximum electric current input.

In other embodiments, the memory includes instructions, which when executed by the processor, cause the processor to calculate the distance between the first surface and the second surface of the flow channel according to the formula:

$$t = \frac{\lambda^2}{2n\delta\lambda}\frac{\Delta f_{if}}{f_m} \quad (2)$$

where: t is distance between the first surface and the second surface; $\lambda$ is wavelength of irradiation; n is refractive index; $f_m$ is modulation frequency; $\Delta f_{if}$ is frequencies of interference oscillations; and $\delta\lambda$ is wavelength variation between minimum and maximum electric current input.

In still other embodiments, the memory includes instructions, which when executed by the processor, so that the laser modulation occurs with a current ramp that depends on time such that in some examples the laser wavelength is expressed according to the formula:

$$\lambda_2(t) = \lambda_1 + \alpha I_0(e^{\frac{t}{\tau}} - 1) \quad (3)$$

where: $I_0$ is a first current input; $\lambda_1$ is wavelength of irradiation at the first input current; $\lambda_2$ is wavelength of irradiation at a second input current; $\alpha$ is a derivative of the wavelength over the current; t is time; and $\tau$ is exponential current ramp time constant.

In yet other embodiments, the memory includes instructions, which when executed by the processor, cause the processor to calculate the distance between the first surface and the second surface of the flow channel according to the formula:

$$\frac{\Delta f_{if}}{f_m} = 2\frac{I}{\lambda_1}\frac{1}{\left(1 + \frac{\lambda_1}{\alpha I_0(e^{\frac{t}{\tau}} - 1)}\right)} \quad (4)$$

where: I is distance between the first surface and the second surface; $I_0$ is a first current input; $\lambda_1$ is wavelength of irradiation at the first input current; $\alpha$ is a derivative of the wavelength over the current; $f_m$ is modulation frequency; $\Delta f_{if}$ is frequencies of interference oscillations; t is modulation time period; and $\tau$ is exponential current ramp time constant.

The memory also includes instructions, which when executed by the processor, cause the processor to determine whether an object is present on the surface of the flow channel based on the determined distance. In some embodiments, the memory includes instructions to compare the determined distance between the first surface and the second surface with an expected distance between the first surface and the second surface. In certain embodiments, the memory includes instructions to determine that an object is present on a surface of the flow channel when the determined distance and the expected distance between the first surface and the second surface do not match. In other embodiments, the memory includes instructions to determine that an object is present on a surface of the flow channel when the difference between the determined distance and the expected distance between the first surface and the second surface is above a predetermined threshold, such as where the difference between the determined distance and the expected distance between the first surface and the second surface is 0.01 µm or more, such as 0.05 µm or more, such as 0.1 µm or more, such as 0.5 µm or more, such as 1 µm or more, such as 2 µm or more, such as 3 µm or more, such as 4 µm or more, such as 5 µm or more, such as 6 µm or more, such as 7 µm or more, such as 8 µm or more, such as 9 µm or more, such as 10 µm or more, such as 20 µm or more, such as 30 µm or more, such as 40 µm or more and including where the difference between the determined distance and the expected distance between the first surface and the second surface is 100 µm or more.

Aspects of the invention further include flow cytometric systems having a laser, a photodetector and a processor having memory operably coupled to the processor where the memory includes instructions stored thereon, which when executed by the processor, cause the processor to determine whether an object is present on a surface of a flow channel of a flow cell as described above. Suitable flow cytometry systems include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49 (pt 1):17-28; Linden, et. al., *Semin Thromb Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ flow cytometer, BD Biosciences FACSVantage™, BD Biosciences FACSort™, BD Biosciences FACSCount™, BD Biosciences FACScan™, and BD Biosciences FACSCalibur™ systems, a BD Biosciences Influx™ cell sorter, BD Biosciences Jazz™ cell sorter and BD Biosciences Aria™ cell sorter or the like.

In some embodiments, the subject systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

Figure 4A:
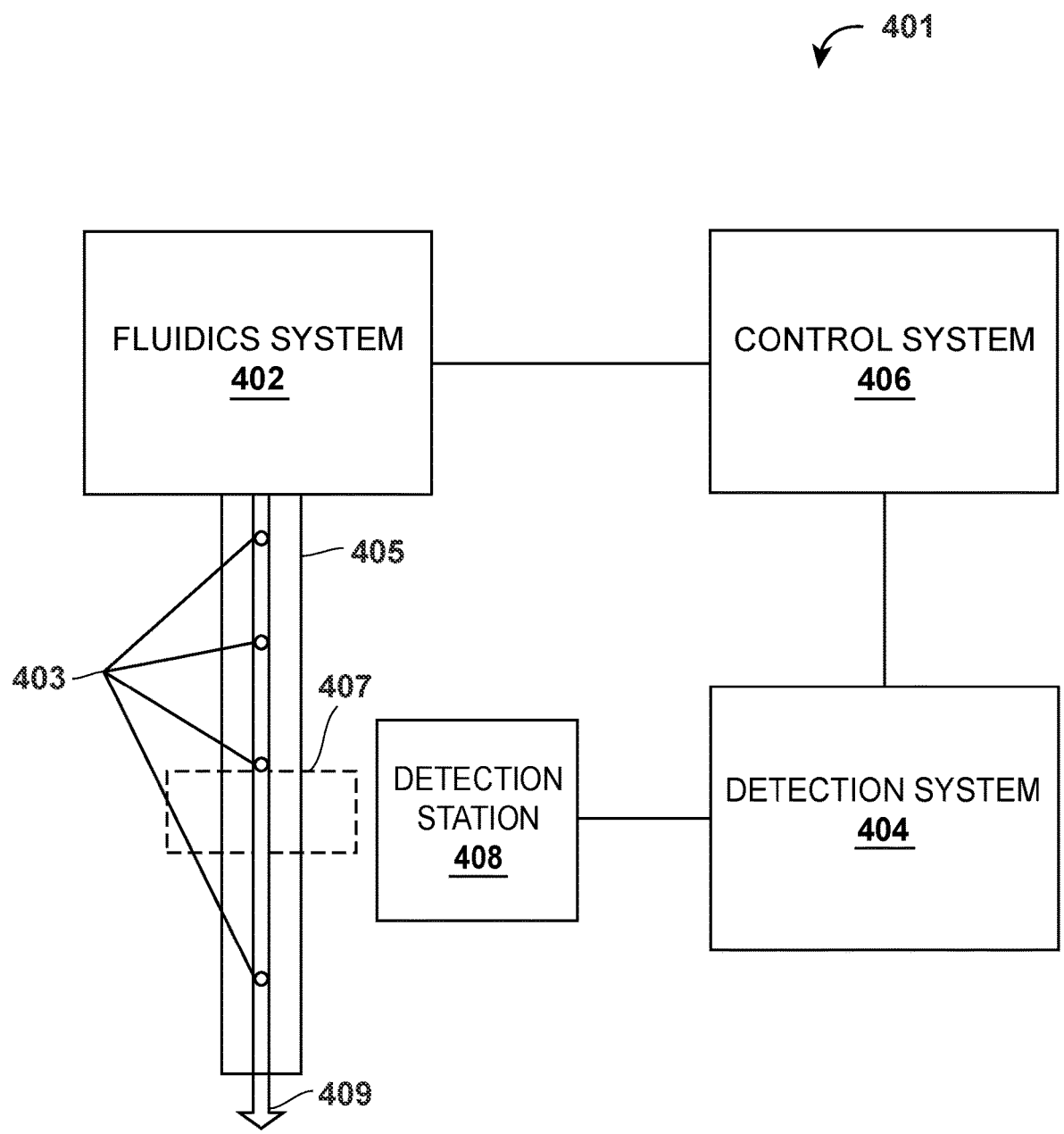
FIG. 4A depicts a functional block diagram of a particle analysis system according to certain embodiments.

In some embodiments, systems of interest include a particle analysis system which can be used to analyze and characterize particles, with or without physically sorting the particles into collection vessels. FIG. 4A shows a functional block diagram of an example of a particle analysis system. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
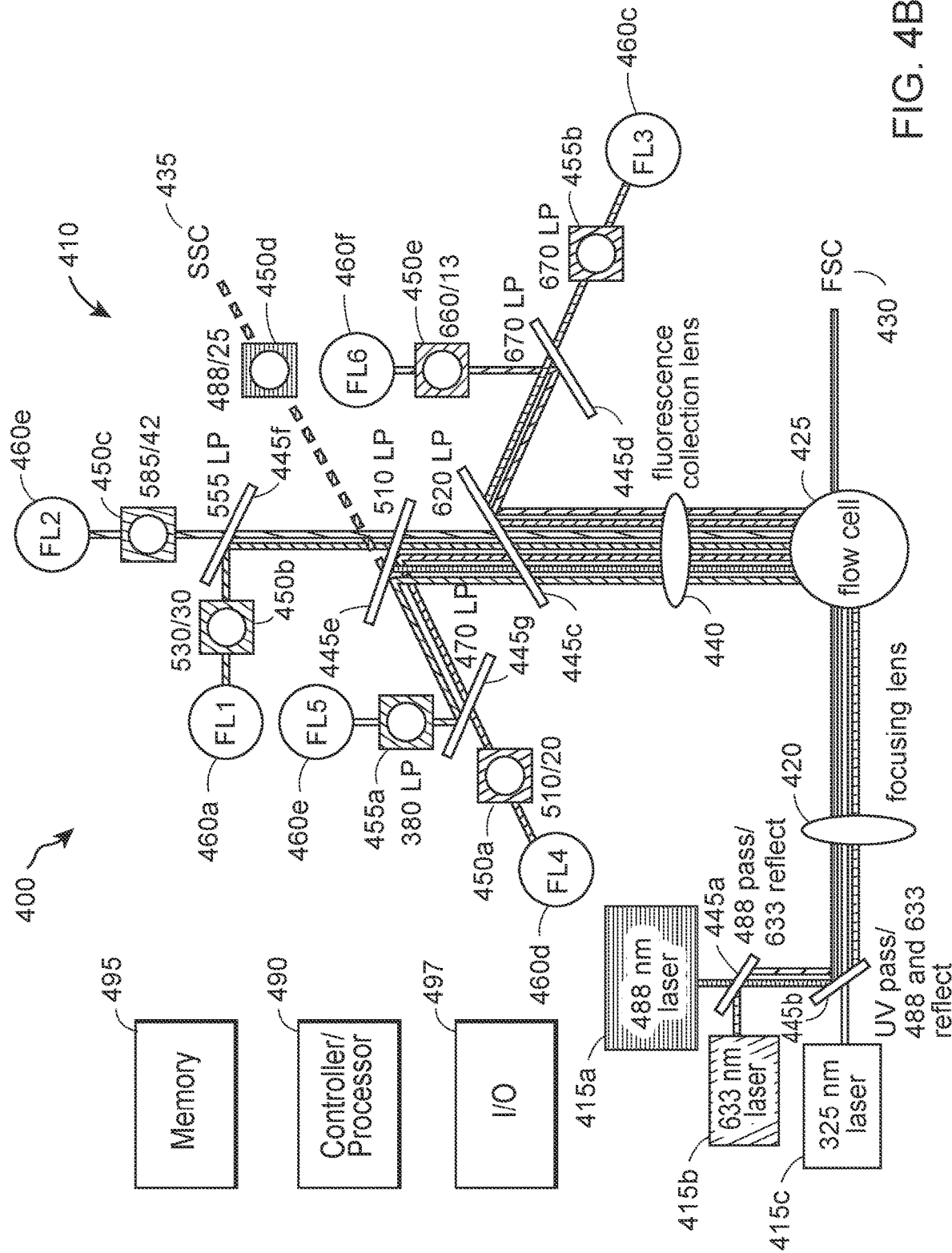
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495.

The controller/processor 490 can be configured to evaluate one or more assignments of labels to markers.

Figure 5:
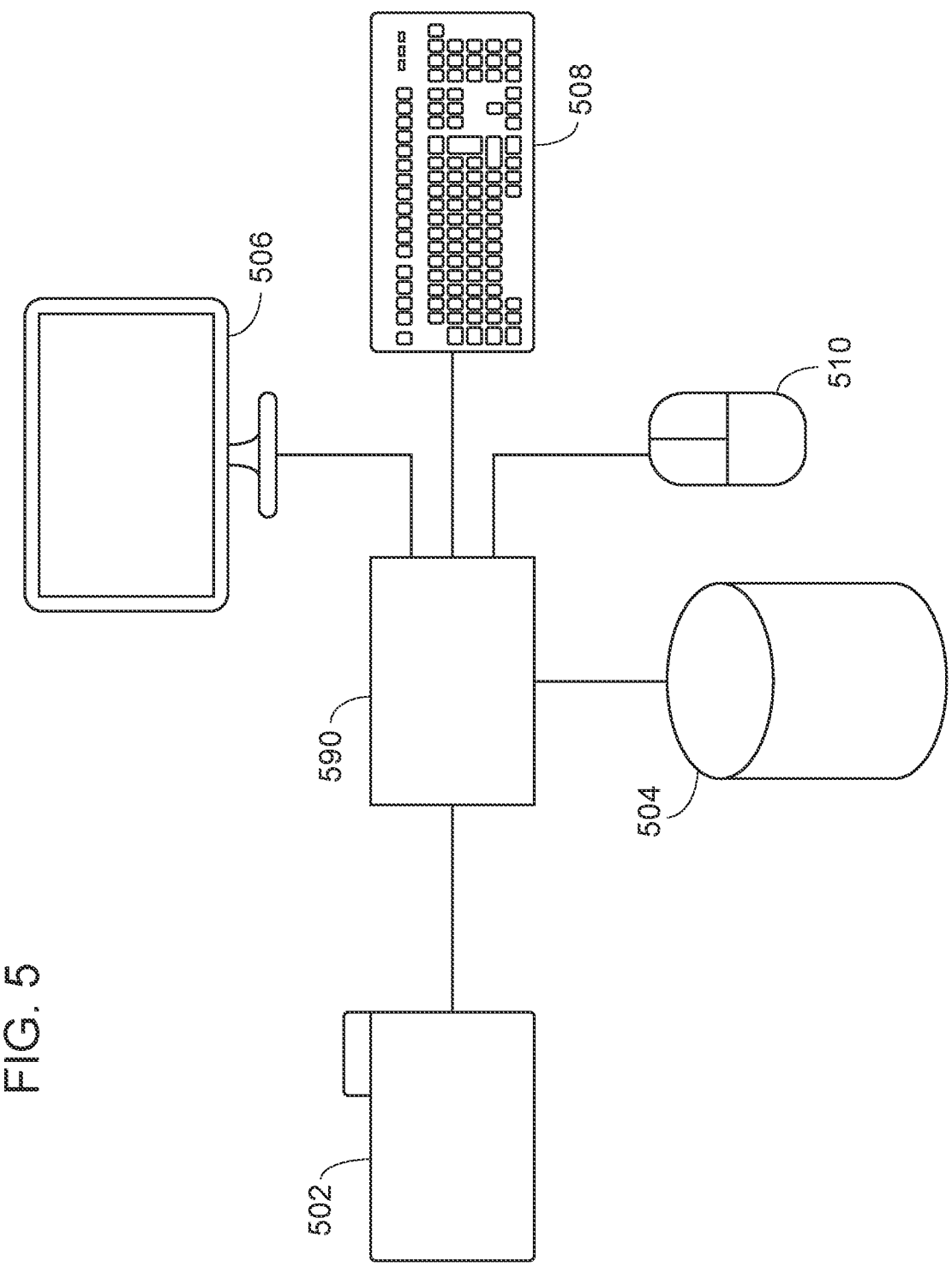
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500. The analytics controller 500 can be connected to a storage device 504.

The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
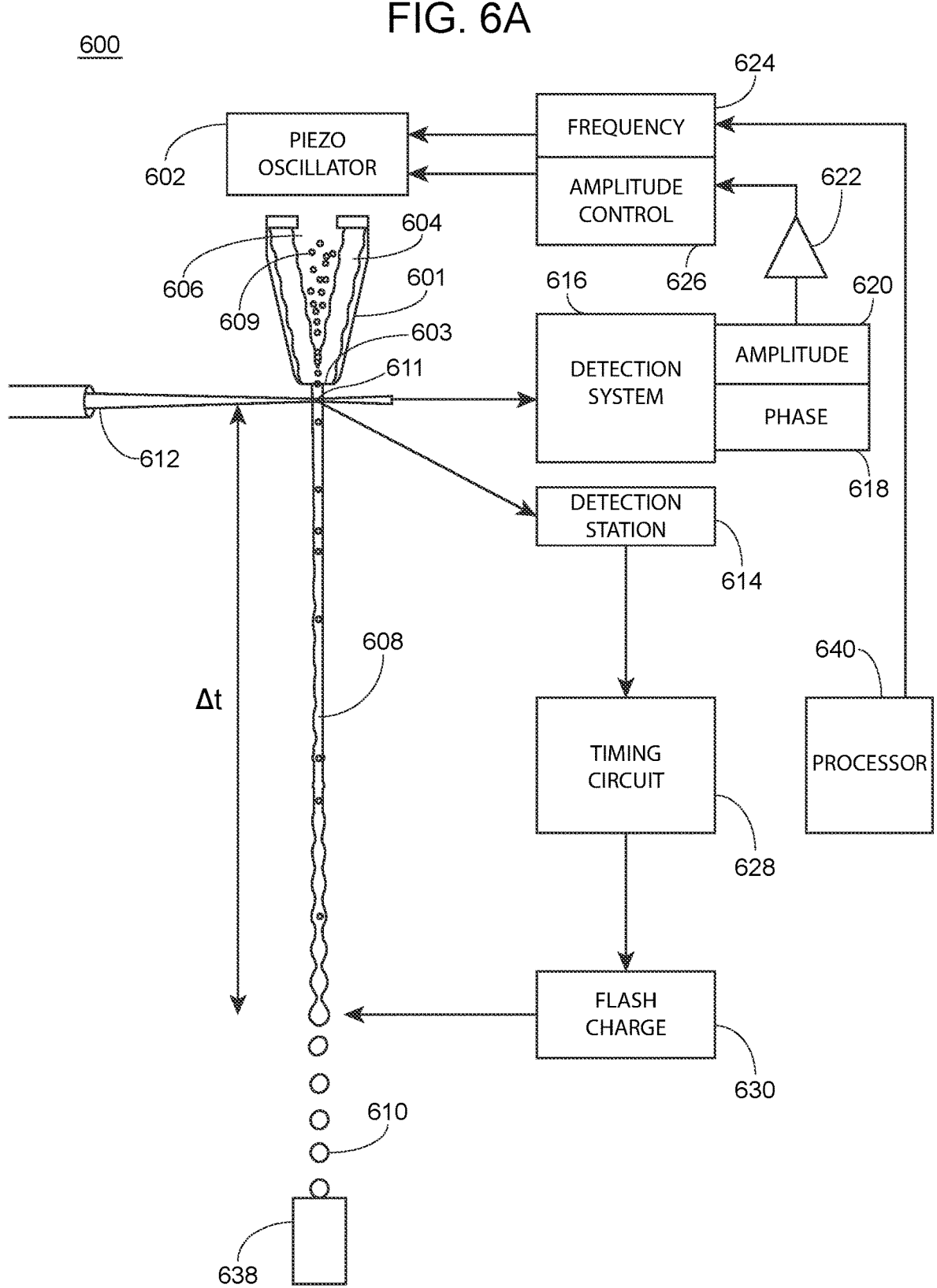
FIG. 6A depicts a schematic drawing of a particle sorter system according to certain embodiments.

In some embodiments, systems of interest include a particle sorter system. FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g. a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (at), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g. a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
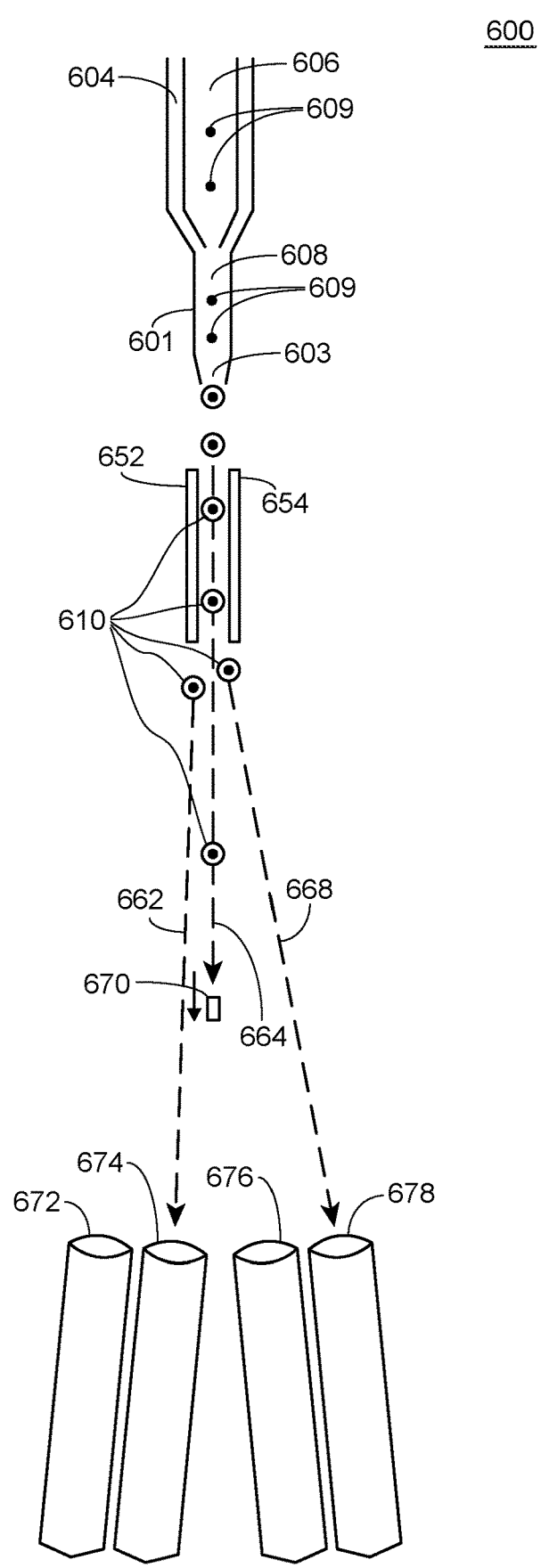
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, N.J.).

Computer-Controlled Systems

Aspects of the present disclosure further include computer controlled systems for practicing the subject methods, where the systems further include one or more computers for complete automation or partial automation of a system for practicing methods described herein. In some embodiments, systems include a computer having a computer readable storage medium with a computer program stored thereon, where the computer program when loaded on the computer includes instructions for irradiating a flow cell with two or more frequency modulated beams of light; and detecting first and second reflected beams of light reflected by a first surface and a second surface of the flow channel. In some embodiments, the computer readable storage medium includes algorithm for calculating a frequency of oscillations generated by interference between the first and second reflected beams of light, algorithm for determining a distance between the first surface and the second surface based on the calculated frequency of interference oscillations and algorithm for determining whether an object is present on the surface of the flow channel based on the determined distance.

The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

FIG. 7 depicts a general architecture of an example computing device 600 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Kits

Aspects of the invention further include kits, where kits include one or more components of the subject systems are also provided. Kits according to certain embodiments include a flow cell having a flow channel, one or more lasers and an electric current source configured to adjust the input current to the laser to modulate the laser over one or more predetermined modulation periods. In some embodiments, lasers present in the kit are vertical cavity surface emitting lasers. The subject kits may also include one or more photodetectors, such as an avalanche photodiode.

The various assay components of the kits may be present in separate containers, or some or all of them may be pre-combined. For example, in some instances, one or more components of the kit, e.g., a laser and an electric current source for operationally coupling to the laser is present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems and computer systems find use in a variety of applications where it is desirable to improve the analysis of particles in a sample by flow cytometry. The present disclosure finds use in quality control of the flow cell of a flow cytometer, such as where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user to manually inspect a flow cell during sample analysis with a flow cytometer. In certain embodiments, the subject systems provide fully automated protocols so that inspection of the flow cell of a flow cytometer requires little, if any human input.

The present disclosure also finds use in applications where cells prepared from a biological sample may be desired for research, laboratory testing or for use in therapy. In some embodiments, the subject methods and systems may facilitate the improved quality and accuracy in obtaining individual cells prepared from a target fluidic or tissue biological sample.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method for determining whether an object is present on a surface of a flow channel of a flow cell, the method comprising:
    irradiating the flow cell with two or more frequency modulated beams of light from a laser;
    detecting first and second reflected beams of light reflected by a first surface and a second surface of the flow channel;
    calculating a frequency of oscillations generated by interference with a low frequency between the first and second reflected beams of light;
    determining a distance between the first surface and the second surface based on the calculated low frequency of interference oscillations; and
    determining whether a particle is present on the surface of the flow channel based on the determined distance.

2. The method according to claim 1, wherein irradiating the flow cell comprises modulating the frequency of the laser over a period of time.

3. The method according to claim 2, wherein modulating the frequency of the laser comprises adjusting an input current to the laser.

4. The method according to claim 3, wherein the input current to the laser is adjusted by 1 mA or more.

5. The method according to claim 4, wherein the input current to the laser is adjusted by 1 mA or more over a period of 1000 μs or more.

6. The method according to claim 1, wherein the laser is modulated at a frequency ranging from 1 KHz to 100 KHz.

7. The method according to claim 1, wherein the wavelength of light emitted by the laser is changed by 0.1 nm or more.

8. The method according to claim 7, wherein the wavelength of light emitted by the laser is changed by 0.1 nm to 5 nm.

9. The method according to claim 1, wherein the laser is a vertical cavity surface emitting laser (VCSEL).

10. The method according to claim 1, wherein the flow cell is irradiated at an incident angle ranging from 15° to 75°.

11. The method according to claim 1, wherein the distance between the first surface and the second surface of the flow channel is calculated according to the formula:

$$\Delta f_{if} = 2 \frac{\Delta f_\lambda}{t_m} \frac{R}{c} = 2 \frac{\delta \lambda}{\lambda^2} \frac{R}{t_m} \qquad (1)$$

wherein:
δ is wavelength of irradiation;
$\Delta f_\delta$ is difference in optical frequency of modulated laser;
$\Delta f_{if}$ is frequencies of interference oscillations;
$t_m$ is time period of modulation;
R is distance between the first surface and the second surface;
c is speed of light; and
δλ is wavelength variation between minimum and maximum electric current input.

12. The method according to claim 11, wherein the distance between the first surface and the second surface of the flow channel is calculated according to the formula:
wherein:

t is distance between the first surface and the second surface;
δ is wavelength of irradiation;
n is refractive index;
$f_m$ is modulation frequency;
$\Delta f_{if}$ is frequencies of interference oscillations; and
δλ is wavelength variation between minimum and maximum electric current input.

13. The method according to claim 11, wherein the laser modulation occurs with a current ramp that depends on time such that the laser wavelength is expressed according to the formula:

$$\lambda_2(t) = \lambda_1 + \alpha I_0 (e^{\frac{t}{\tau}} - 1) \quad (3)$$

wherein:
$I_0$ is a first current input;
$\delta_1$ is wavelength of irradiation at the first input current;
$\delta_2$ is wavelength of irradiation at a second input current;
α is a derivative of the wavelength over the current;
t is time; and
τ exponential current ramp time constant.

14. The method according to claim 11, wherein the distance between the first surface and the second surface of the flow channel is calculated according to the formula:

$$\frac{\Delta f_{if}}{f_m} = 2\frac{I}{\lambda_1} \frac{1}{\left(1 + \frac{\lambda_1}{\alpha I_0 (e^{\frac{t}{\tau}} - 1)}\right)} \quad (4)$$

wherein:
I is distance between the first surface and the second surface;
$I_0$ is a first current input;
$\delta_1$ is wavelength of irradiation at the first input current;
α is a derivative of the wavelength over the current;
$f_m$ is modulation frequency;
$\Delta f_{if}$ is frequencies of interference oscillations;

t is modulation time period; and
τ is exponential current ramp time constant.

15. The method according to claim 1, wherein the oscillations generated by interference between the first and second reflected beams of light are low frequency interference oscillations.

16. The method according to claim 1, further comprising comparing the determined distance between the first surface and the second surface with an expected distance between the first surface and the second surface.

17. The method according to claim 16, wherein an object is determined to be present on a surface of the flow channel when the determined distance and the expected distance between the first surface and the second surface do not match.

18. The method according to claim 16, wherein an object is determined not to be present on a surface of the flow channel when the determined distance and the expected distance between the first surface and the second surface match.

19. A system comprising:
a laser configured to irradiate a flow cell comprising a flow channel with two or more frequency modulated beams of light;
a photodetector configured to detect first and second reflected beams of light reflected by a first surface and a second surface of the flow channel; and
a processor comprising memory operably coupled to the processor wherein the memory comprises instructions stored thereon, which when executed by the processor, cause the processor to:
calculate a frequency of oscillations generated by interference with a low frequency between the first and second reflected beams of light;
determine a distance between the first surface and the second surface based on the calculated low frequency of interference oscillations; and
determine whether a particle is present on the surface of the flow channel based on the determined distance.

20. The system according to claim 19, wherein the laser is configured to be modulated over a period of time.

* * * * *